(12) United States Patent
Tubach

(10) Patent No.: US 6,588,719 B1
(45) Date of Patent: Jul. 8, 2003

(54) MOUNTING AND SUPPORT BRACKET

(75) Inventor: Dirk Tubach, Santa Barbara, CA (US)

(73) Assignee: Hollingsead International, Inc., Goleta, CA (US)

( * ) Notice: Subject to any disclaimer, the term of this patent is extended or adjusted under 35 U.S.C. 154(b) by 0 days.

(21) Appl. No.: 10/241,038

(22) Filed: Sep. 10, 2002

(51) Int. Cl.[7] ................................................ E04G 3/00
(52) U.S. Cl. .............................. 248/282.1; 248/288.31; 248/922
(58) Field of Search ......................... 248/282.1, 289.11, 248/292.12, 278.1, 288.31, 919, 920, 921, 922, 923, 309.1

(56) References Cited

U.S. PATENT DOCUMENTS 6,517,040 B1 * 2/2003 Wen ........................ 248/278.1

OTHER PUBLICATIONS

Application publication US 2002/0175256 A1, inventor Louh, Publication Date Nov. 28, 2002.*

* cited by examiner

Primary Examiner—Ramon O. Ramirez
(74) Attorney, Agent, or Firm—Jack C. Munro

(57) ABSTRACT

A mounting and support bracket which is designed to support and make available to an individual a piece of electronic equipment, such as a small computer and monitor combination. The mounting of the support bracket is to be fixable onto an exterior structure. The mounting and support bracket is to be manually activated to occupy either a fixed position or a movement position. The movement position will permit locating of the computer/monitor in a readily observable position. The fixed position will then fix the bracket in the position that has been established by the movement position.

14 Claims, 4 Drawing Sheets

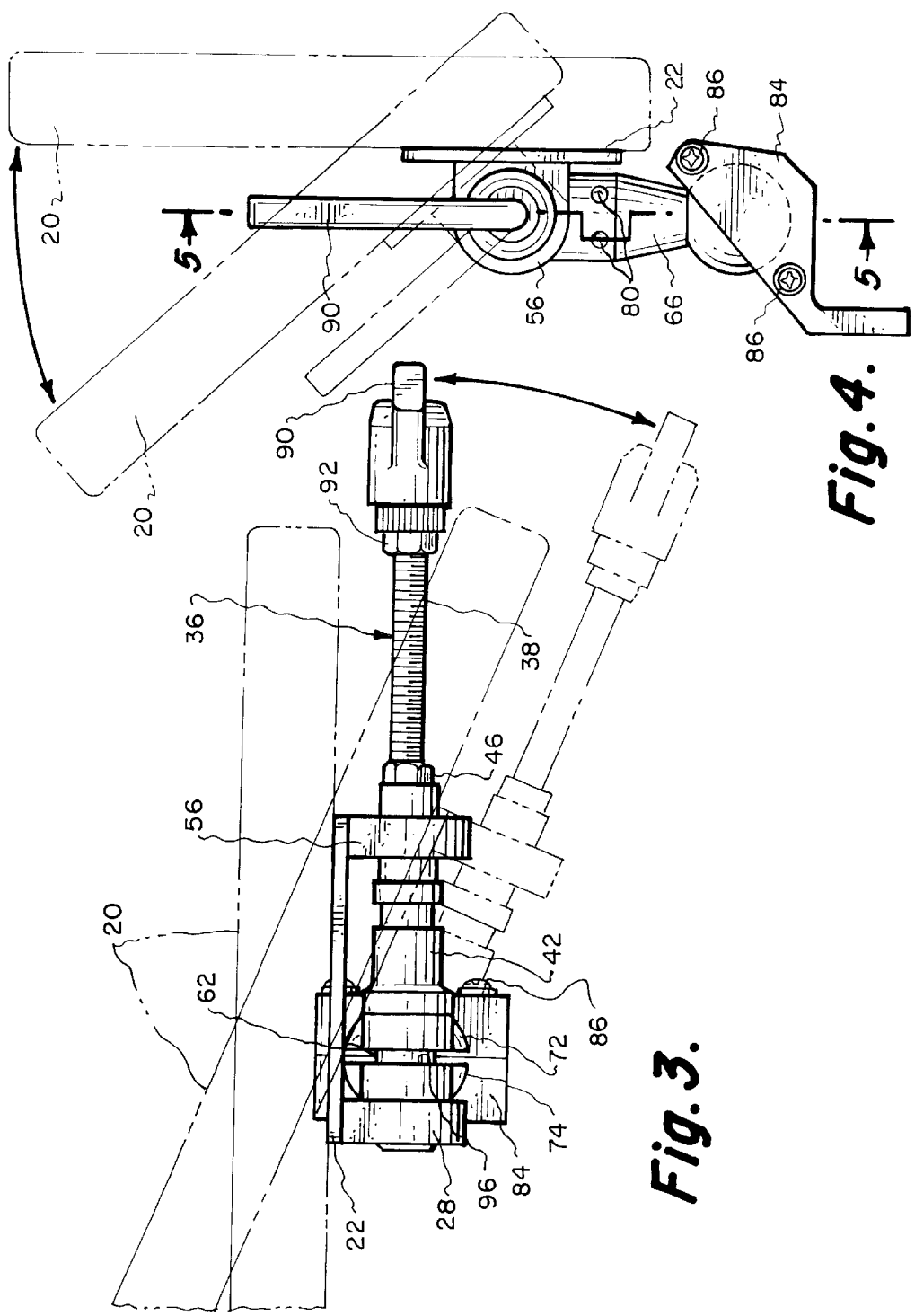

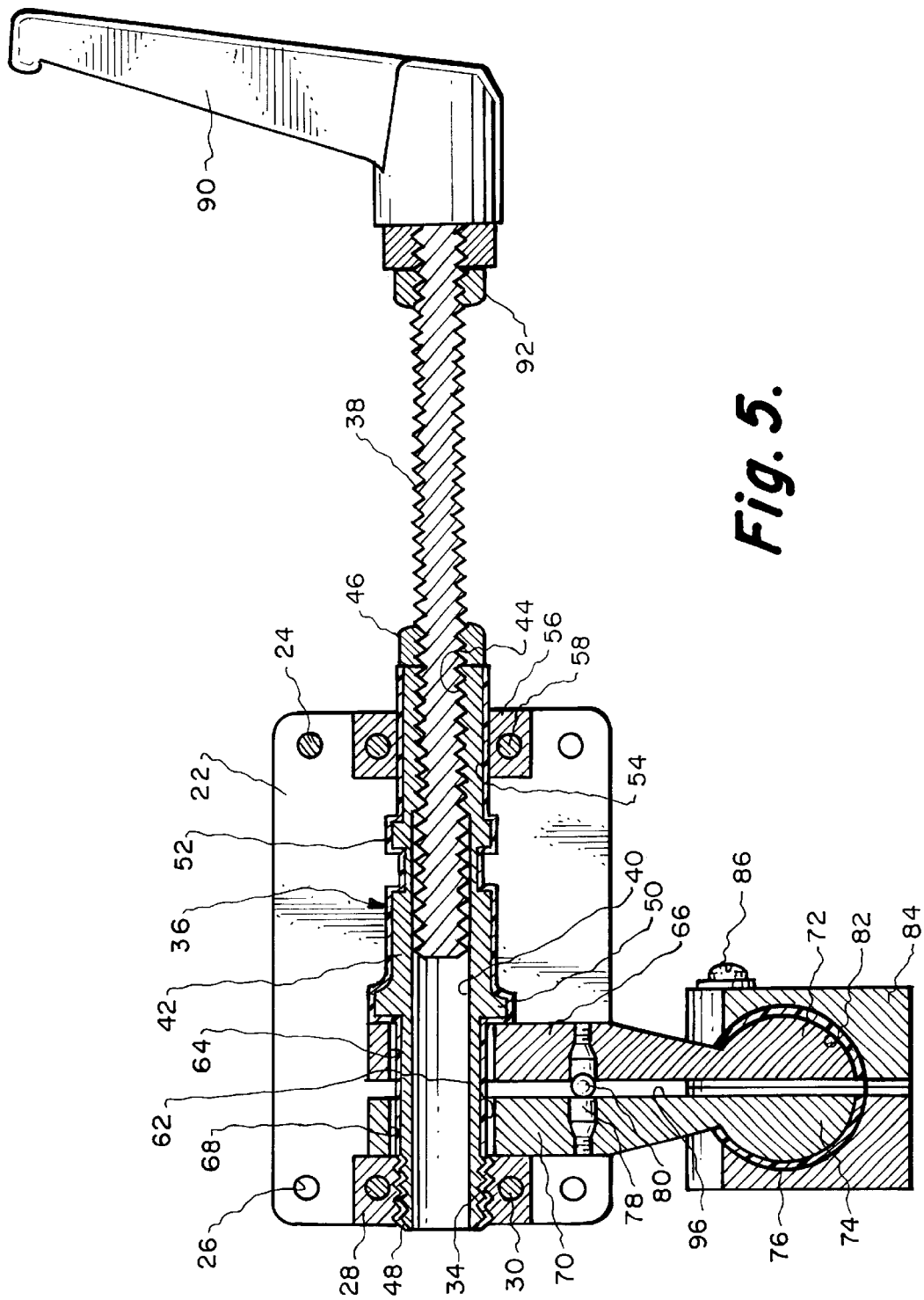

MOUNTING AND SUPPORT BRACKET

BACKGROUND OF THE INVENTION

1. Field of the Invention

The field of this invention relates to mounting and support brackets and more particularly to a mounting and support bracket for a piece of electronic equipment that will permit that piece of electronic equipment to be moved to a readily observable and operating position and also movable to a conveniently accessible stowage position.

2. Description of the Related Art

In the past, there have been constructed numerous different types of mounting and support brackets for mounting pieces of equipment. However, in some mounting locations, there may be a minimal amount of space available for the mounting bracket. A typical situation would be within the cockpit of an airplane. Pilots have need for electronic equipment that is used in the flying of an aircraft. One such piece of electronic equipment is known as an electronic flight bag. This electronic flight bag is basically in the form of a computer which has a monitor. Typical such flight bags comprise a rectangular shape approximately ten to twelve inches in length and six to eight inches in height with the thickness of about one inch. These flight bags are commonly mounted within a leather or plastic case. These flight bags are used by the pilot in ascertaining certain flight information. These flight bags are commonly carried by the pilot and copilot when flying of an aircraft.

Typically, these flight bags are just placed on the floor of the cockpit and are picked up when it is required that such is to be used. This requires that the pilot or copilot to look around when flying of the aircraft to find the flight bag in order to pick it up and then to open the harness of the flight bag, turn on the flight bag and then use it. After it is used, the pilot or copilot has to then return it to its stowage position.

It would be far more convenient if there were some way that the flight bag could be mounted in the cramped area of the cockpit so that the flight bag could be quickly and easily maneuvered to a readily visible and readily operable position relative to the pilot and copilot while still permitting the pilot and copilot to keep his or her eyes on the task of flying the airplane. Also, when the flight bag is no longer needed, it would be desirable to quickly and easily maneuver the flight bag to a stowage position but yet where the stowage position is readily accessible when it is desired to reuse the flight bag.

SUMMARY OF THE INVENTION

A first basic embodiment of a mounting and support bracket for a piece of electronic equipment which utilizes a base adapted to be fixed to an exterior structure. The base has a socket and within that socket is to be mounted a bifurcated ball unit which has a ball from which extends a pair of legs which are separated by a gap. A fulcrum is mounted to the ball unit and located within the gap. Each leg has a through hole that are in alignment. The fulcrum is spaced from the through holes and also spaced from the ball. A female threaded collar is mounted on mounting plate with the mounting plate being designed to support the piece of electronic equipment. An actuator rod assembly which has an actuator which is threadably connected to the female threaded collar. The actuator passes through the through holes in a loose fitting arrangement. Turning of the actuator in one direction results in moving of the pair of legs closer together and pressing of the collar which will fix the mounting plate relative to the bifurcated ball unit and also fix the ball relative to the base. Opposite rotation of the actuator will permit three hundred and sixty degree movement of the mounting plate relative to the base and also permit pivoting of the mounting about a lineal axis.

A further embodiment of the present invention is where the first basic embodiment is modified by the ball being constructed of two parts.

A further embodiment of the present invention is where the first basic embodiment is modified by the through holes being defined as being circular.

A further embodiment of the present invention is where the first basic embodiment is modified by the including of a guide collar on the mounting plate with this guide collar being spaced from the female threaded collar and the actuator passing through this guide collar.

A further embodiment of the present invention is where the first basic embodiment is modified by the mounting of a handle on a free outer end of the actuator.

A further embodiment of the present invention is where the first basic embodiment is modified by the ball having attached to its exterior surface a rubber coating.

A further embodiment of the present invention is where the first basic embodiment is modified by the including of a low frictional coating on the actuator eliminating the need for separate bearings and permitting unrestricted easy movement of the bracket to different positions.

A further embodiment of the present invention is where the first basic embodiment is modified by the actuator rod assembly being adjustable relative to the mounting plate in order to vary the spacing of an outer free end of the actuator rod assembly relative to the mounting plate.

A second basic embodiment of the present invention comprises a mounting and support bracket which includes a mounting plate with there being a female threaded collar mounted on the mounting plate. An actuator rod is threadably connected to the collar with the actuating rod having formed thereon a shoulder. There is a ball mounted on the base with the ball being constructed of two separate parts. A pair of leg members are attached to the ball and extend therefrom with the leg members being spaced apart forming a gap. The leg members have a pair of aligned holes with there being a single hole formed within each leg member. The actuator rod passes through these holes with there being a loosely mounted arrangement between the actuator rod and the holes. The leg members are located between the shoulder and the collar. A fulcrum is mounted on the leg members. Rotating of the actuator rod in one direction causes pressing of the leg members between the shoulder and the collar causing pivoting to occur about the fulcrum and decreasing the width of the gap in the area of the holes and also causing the leg members to be tightly pressed against the collar fixing in position the mounting plate relative to the leg members, and also simultaneously widening of the spacing between the parts of the ball which tightly fixes the ball to the base.

A further embodiment of the present invention is where the second basic embodiment is modified by the holes that are formed within the leg members which are cylindrical.

A further embodiment of the present invention is where the second basic embodiment is modified by the including of a guide collar being also mounted on the mounting plate with the actuator rod being conductible through this guide collar.

A further embodiment of the present invention is where the second basic embodiment is modified by the mounting of a handle on the free outer end of the actuator rod.

A further embodiment of the present invention is where the second basic embodiment is modified by the forming of a rubber coating on the exterior surface of the ball and also forming of a low frictional coating on the actuator rod.

A further embodiment of the present invention is where the second basic embodiment is modified by the actuator rod being adjustable relative to the mounting plate.

BRIEF DESCRIPTION OF THE DRAWINGS

For a better understanding of the present invention, reference is to be made to the accompanying drawings. It is to be understood that the present invention is not limited to the precise arrangement shown in the drawings.

FIG. 3 is a top plan view of the mounting and support bracket of the present invention depicting the three hundred and sixty degree movement that the bracket could be moved;

FIG. 4 is an end view of the mounting and support bracket of the present invention showing the pivoting movement that is available to the bracket; and FIG. 5 is a longitudinal cross-sectional view through the mounting and support bracket of the present invention taken along line 5—5 of FIG. 4.

DETAILED DESCRIPTION OF THE INVENTION

Figure 1:
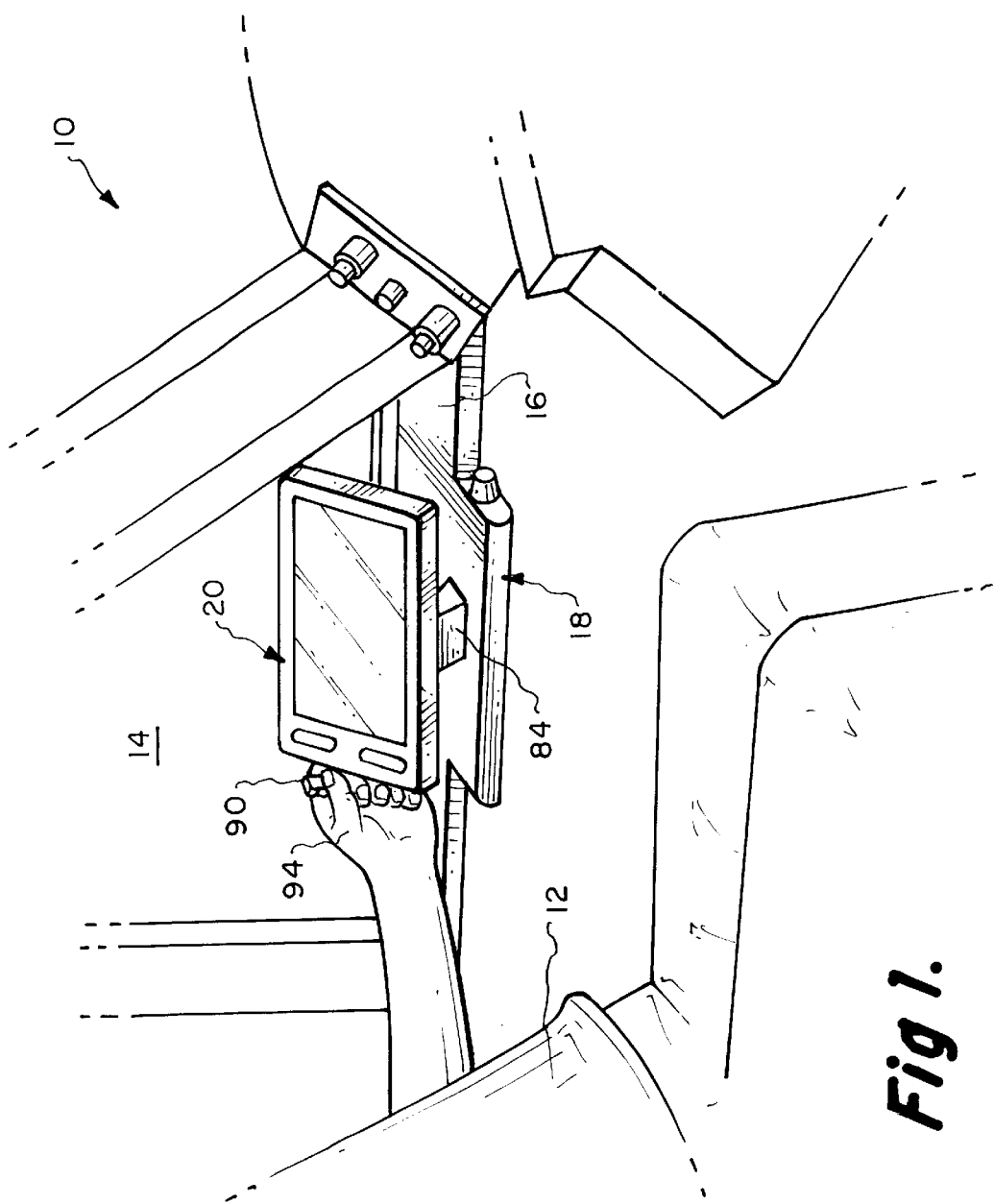
FIG. 1 is an isometric view showing the mounting and support bracket of the present invention mounted in conjunction with the cockpit of an aircraft.
Figure 2:
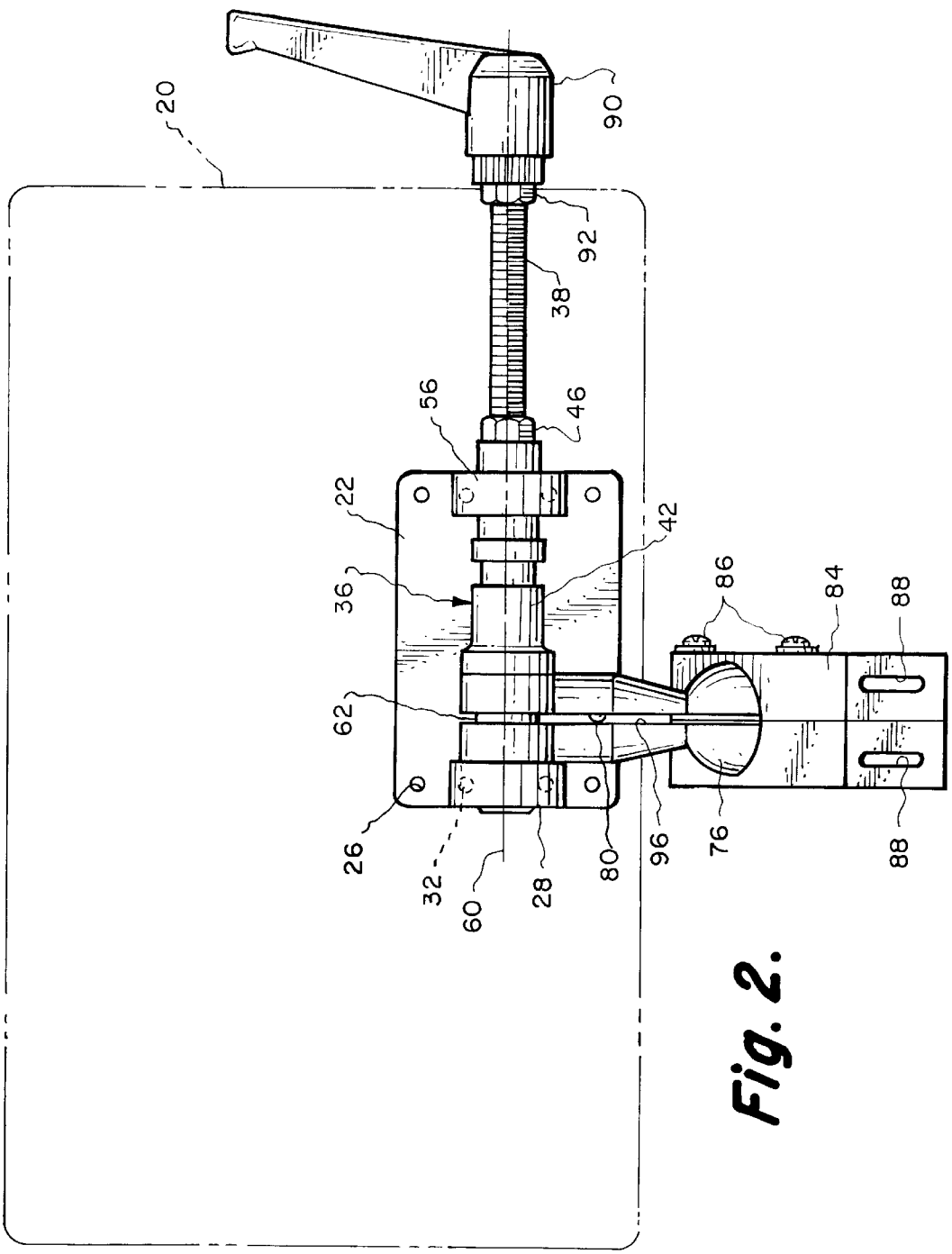
FIG. 2 is a back view of the mounting and support bracket of the present invention showing its relation to the piece of electronic equipment to which it is connected.

Referring particularly to the drawings, there is shown in FIG. 1 a cockpit 10 of an aircraft. The cockpit 10 has a pilot or copilot 12 seated therein. The cockpit 10 includes a window 14 and a window ledge 16. The mounting and support bracket 18 of this invention is to be fixedly mounted onto the window ledge 16. However, it is to be understood that numerous other mountings for the mounting and support bracket 18 of this invention could be utilized other than on a window ledge 16. For example, the mounting and support bracket could be mounted on the console between the pilot and the copilot. Additionally, the mounting and support bracket 18 of this invention could be mounted in conjunction with environments other than having to do with aircraft.

A piece of an electronic equipment, such as a electronic flight bag 20, is to be attached, usually with bolt or screw fasteners, to a mounting plate 22. Fasteners 24, four in number, are what is used to secure the mounting plate 22 to the electronic flight bag 20. The fasteners 24 each individually connect with a hole 26 which is formed within the mounting plate 22 with there being a hole located directly adjacent each corner of the rectangularly shaped mounting plate 22. Typically, the mounting plate 22 will be constructed of sheet aluminum, however any rigid material could be utilized. Fixedly mounted on the back side of the mounting plate 22 is a threaded collar 28. The threaded collar 28 is also secured by typical fasteners 30, such as screws or bolts, to the mounting plate 22. The fasteners 30 engage with the holes 32 formed within the collar 28. The threaded collar 28 includes a through hole the wall of which includes a series of screw threads 34. A typical diameter for the female threads 34 would be about three-quarters of an inch.

An actuator, in the form of actuator rod 36, has an externally threaded rod 38 which is threadingly received within a center hole 40 of an actuator guide 42. A portion of the center hole 40 includes a series of female threads 44. The threaded rod 38 is in continuous engagement with the threads 44. Also threadably mounted on the threaded rod 38 is a nut 46. The nut 46 is to be located in an abutting engagement with one end of the actuator guide 42. The opposite end of the actuator guide 42 that is opposite the nut 46 includes a series of male threads 48. The male threads 48 are to be in continuous engagement with the female threads 34 of the threaded collar 28. Formed on the exterior surface of the actuator guide 42 is a shoulder 50. The exterior surface of the actuator guide 42 is to be coated with a low frictional coating 52. The desirable form of such a coating would include a material which is known under the trade name of Teflon.

The end of the actuator guide 42 that is located directly adjacent the nut 46 is conducted through through opening 54 of the guide collar 56. The guide collar 56 is fixedly mounted by fasteners 58, such as bolt fasteners or screw fasteners, to the mounting plate 22. The longitudinal center axis 60 of the through opening 54 is in alignment with the longitudinal center axis of the threads 34. Also, the longitudinal center axis of the threaded rod 38 coincides with the axis 60. The actuator guide 42 forms a close fit within the through opening 54 yet pivoting movement of the actuator guide 42 is permitted relative to the guide collar 56.

Located between the shoulder 50 and threaded collar 28 is a decreased diameter section 62. The decreased diameter section 62 passes through a through hole 64 of a leg member 66. Also, the decreased diameter section 62 passes through a through hole 68 of a leg member 70. It is to be noted that the through holes 64 and 68 are significantly larger in diameter than the diameter of section 62. Therefore, a loose fit is established between the section 62 and each of the leg members 66 and 70. The reason for this is that leg member 66 will be shown to tilt slightly relative to the decreased diameter section 62. In order to accommodate that tilting, the through hole 64 has to be over sized relative to the decreased diameter 62.

The outer end of the leg members 66 is mounted to a semispherical member 72. The outer end of the leg member 70 is also mounted to a similar semispherical member 74. These semispherical members 72 and 74 are mounted in a reverse spacing relationship relative to each other with the result that the members 72 and 74, in essence, form a ball. The exterior surface of this ball is to be coated with a rubber layer 76. Typically, the thickness of the rubber layer 76 will be about 0.05 of an inch. Mounted within the leg member 70 is a steel pin 78. Also mounted within the leg member 66 is a rounded head pin 80. The rounded head 80 abuts against the steel pin 78 at all times. In actual practice, there may be utilized two in number of the rounded head pins 80 and two in number of the steel pins 78 located in a spaced apart manner. The rounded head pin 80 in conjunction with the steel pin 78 produces a fulcrum. This fulcrum is for pivoting to occur of a leg member 66 relative to the decreased diameter section 62.

The ball composed of semispherical members 72 and 74 is mounted within a socket 82 which is formed within a base 84. Base 84 is actually composed of two separate parts that are secured together by conventional bolt fasteners 86. The base 84 includes a pair of elongated slots 88. These slots 88 are to be utilized to secure with fasteners, which are not shown, the base 84 to a mounting location, such as the window ledge 16. The ball composed of members 72 and 74 assumes a close fit with the socket 82. However, pivoting movement of the ball members 72 and 74 is permitted within the socket 82.

The outer free end of the threaded rod 38 is threadably secured to a handle 90. The threaded rod 38 is fixedly mounted to the handle 90 by means of a conventional nut 92. The handle 90 will, in all probability, be capable of being adjusted in position relative to the threaded rod 38. The reason for this is that in it's normal at-rest position, one usually will want the handle 90 to assume an aligned position with the electronic flight bag 20 and not stick upwardly.

Because the mounting and support bracket 18 of this invention is designed to be utilized in conjunction with different sizes of electronic flight bags 20, it is desirable to have the handle 90 to be adjustable. The handle 90 is designed to be located just exteriorly a side edge of the electronic flight bag 20. If a larger electronic flight bag 20 is used, then the threaded rod 38 is to be unscrewed so as to cause the handle 90 to be extended further outwardly so that it will be free of the side edge of the electronic flight bag 20 but located directly adjacent thereto. When the desired position is achieved, the nut 46 is tightened which then now fixes the threaded rod 38 in position with the actuator guide 42. If a smaller in width electronic flight bag 20 is used, the nut 46 can be loosened and unthreaded some distance and then the threaded rod 38 threadingly turned relative to the female threads 44 until again the handle 90 is located directly adjacent the side edge of the electronic flight bag 20 but again just spaced therefrom. At that particular time, the nut 46 will then be tightened.

The operation of the mounting and support bracket 18 of this invention is as follows: Let it be assumed that the electronic flight bag 20 is in the stowage position, which is shown in FIG. 1. In this position, the handle 90 has torque applied thereto which has threadingly moved the threads 48 relative to the threads 34 which has resulted in shoulder 50 pushing against the leg member 66 which has also caused a force to be applied through the pins 80 and 78 to the leg member 70 which presses leg member 70 tightly against the threaded collar 28. This means that the mounting plate 22 is not capable of pivoting movement about the axis 60. Also, because the shoulder 50 has pressed against the leg member 66, there has been a slight tilting of leg member 66 relative to leg member 70. This tilting has caused a slight spreading apart of the semispherical members 72 and 74 (pivoting about the fulcrum of pins 78 and 80) which has caused these members to tightly bind within the socket 82. This tight binding is facilitated by the rubber layer 76. The result is no movement is permitted between the leg members 66 and 70 relative to the base 84.

Let it now be assumed that the pilot 12 wishes to maneuver the flight bag 20 to a usable position which might be alongside the pilot 12 and just forward of the pilot 12. In order to accomplish this, the pilot 12 places his or her hand 94 on the handle 90 and pivots the handle 90 between ninety to one hundred eighty degrees. This pivoting motion will be such to cause the threaded rod 38 to be moved to the right, in FIG. 5 of the drawings. The pressure that has been applied to the leg member 66 is now released and the semispherical members 72 and 74 tend to move toward each other making the gap 96 not as wide in the area of the ball. The reason for this is that pivoting occurs about the fulcrum composed of the pair of rounded head pins 80 that engage with a pair of steel pins 78. The gap 96 in the area of the through holes 64 and 68 becomes wider with the result that the pressing of the leg members 70 against the threaded collar 28 has been substantially decreased. Therefore, pivoting of the mounting plate 22 about the pivot axis 60 on the actuator guide 42 is permitted with this pivoting action being facilitated by the low frictional coating 52. Also, three hundred and sixty degree movement is permitted of the mounting plate 22 by the ball being pivotable within the socket 82. Once the desired location for the flight bag 20 has been manually obtained, the pilot 12 only needs to move the handle 90 back to its previous position which will, in turn, lock up the leg members 66 and 70 relative to the base 84 and the leg members 70 relative to the mounting plate 22 with the result that the flight bag 20 will remain in its established position. This is the usage position. Movement back to the stowage position is to be achieved by again moving of handle 90 which will loosen the locked arrangement and permit the flight bag 20 to be moved back to the position, shown in FIG. 1. The handle 90 in that position will again be moved ninety to one hundred and eighty degrees at which time it will be then locked in position.

What is claimed is:

1. A mounting and support bracket for a piece of electronic equipment comprising:

a base adapted to be fixed to an exterior structure, said base having a socket;

a mounting plate adapted to be attached to a piece of electronic equipment;

a bifurcated ball unit having a ball from which extends a pair of legs which are separated by a gap, a fulcrum mounted to said ball unit and located within said gap, each said leg having a through hole that are in alignment, said fulcrum being located spaced from said through holes and spaced from said ball, a female threaded collar mounted on said mounting plate; and an actuator rod assembly which has an actuator which is threadably connected to said female threaded collar, said actuator passing through said through holes in a loose fitting arrangement, turning of said actuator in one direction results in moving of said pair of legs closer together and pressing of said legs against said collar which will fix said mounting plate relative to said bifurcated ball unit and also fix said ball relative to said base whereby said mounting plate will be prevented from three hundred and sixty degree movement relative to said base and also pivoting of said mounting plate about a pivot axis relative to said bifurcated ball unit.

2. The mounting and support bracket as defined in claim 1 wherein:

said ball being constructed of two separate parts.

3. The mounting and support bracket as defined in claim 1 wherein:

each said through hole being circular.

4. The mounting and support bracket as defined in claim 1 wherein:

a guide collar being mounted on said mounting plate, said guide collar having a through opening, said actuator passing through said through opening.

5. The mounting and support bracket as defined in claim 1 wherein:

said actuator rod having a free outer end, a handle being mounted on said free outer end, said handle to be manually operated to affect turning of said actuator.

6. The mounting and support bracket as defined in claim 1 wherein:

said ball being coated with a rubber.

7. The mounting and support bracket as defined in claim 1 wherein:
said actuator being coated with a low friction coating.

8. The mounting and support bracket as defined in claim 1 wherein:
said actuator rod assembly being adjustable relative to said mounting plate to vary the distance of an outer free end of said actuator rod relative to said mounting plate.

9. A mounting and support bracket comprising:
a mounting plate;
a female threaded collar mounted on said mounting plate;
an actuator rod being threadably connected to said collar, said actuator rod having a free outer end, said actuator rod having a shoulder;
a ball mounted on said base, said ball being constructed of two separate parts;
a pair of leg members attached to said ball and extending therefrom with one said leg member being attached to one said part of said ball and the other said leg member being attached to the other part of said ball, said leg members being spaced apart forming a gap, said leg members having a pair of aligned holes, said actuator rod passing through said holes, said leg members being located between said shoulder and said collar, said holes being loosely mounted on said actuator rod;
a fulcrum mounted on said leg members;
whereby rotating of said actuator rod in one direction presses said leg members between said shoulder and said collar causing pivoting to occur about said fulcrum and decreasing the width of said gap in the area of said holes and causing said leg members to be tightly pressed against said collar fixing in position said mounting plate relative to said leg members and simultaneously widening of the spacing between said parts of said ball which tightly fixes said ball to said base.

10. The mounting and support bracket as defined in claim 9 wherein:
each hole of said aligned holes being cylindrical.

11. The mounting and support bracket as defined in claim 9 wherein:
there being a guide collar mounted on said mounting plate, said guide collar being spaced from said female threaded collar, said guide collar having a through opening, said actuator rod passing through said through opening establishing a sliding and rotating fit relative to said guide collar.

12. The mounting and support bracket as defined in claim 9 wherein:
a handle mounted on said actuator rod at said free outer end, said handle to be used to cause manual pivoting of said actuator rod.

13. The mounting and support bracket as defined in claim 9 wherein:
said parts that form said ball being coated with a rubber, said actuator rod being coated with a low frictional coating.

14. The mounting and support bracket as defined in claim 9 wherein:
said actuator rod being adjustable relative to said mounting plate.

* * * * *